US006993756B2

(12) United States Patent
Ogawa et al.

(10) Patent No.: US 6,993,756 B2
(45) Date of Patent: Jan. 31, 2006

(54) OPTIMIZATION APPARATUS THAT DECREASES DELAYS IN PIPELINE PROCESSING OF LOOP AND COMPUTER-READABLE STORAGE MEDIUM STORING OPTIMIZATION PROGRAM

(75) Inventors: Hajime Ogawa, Kyoto (JP); Shuichi Takayama, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 643 days.

(21) Appl. No.: 09/798,490

(22) Filed: Mar. 2, 2001

(65) Prior Publication Data

US 2001/0020294 A1    Sep. 6, 2001

(30) Foreign Application Priority Data

Mar. 3, 2000    (JP)    ............................. 2000-059506

(51) Int. Cl.
*G06F 9/45*    (2006.01)

(52) U.S. Cl. ...................... 717/159; 717/150; 717/151; 717/160

(58) Field of Classification Search ................ 717/160, 717/154, 156, 159, 151, 150
See application file for complete search history.

(56) References Cited

U.S. PATENT DOCUMENTS

| | | | | |
|---|---|---|---|---|
| 5,179,702 A | * | 1/1993 | Spix et al. ................... | 718/102 |
| 5,265,253 A | * | 11/1993 | Yamada ....................... | 717/160 |
| 5,303,357 A | * | 4/1994 | Inoue et al. ................ | 717/160 |
| 5,386,562 A | * | 1/1995 | Jain et al. .................... | 717/160 |
| 5,481,723 A | * | 1/1996 | Harris et al. ................. | 717/160 |
| 5,842,022 A | * | 11/1998 | Nakahira et al. ........... | 717/160 |
| 6,247,173 B1 | * | 6/2001 | Subrahmanyam ........... | 717/160 |

FOREIGN PATENT DOCUMENTS

JP    6-103083    4/1994

OTHER PUBLICATIONS

Digital Equipment Corporation, "KAP for DEC Fortran for Digital UNIX", section 4.5.21, Dec. 1996.*
Larus, J.R., "Loop-level parallelism in numeric and symbolic programs", Parallel and Distributed Systems, IEEE Transactions on vol.: 4, Issue: 7, Jul. 1993, pp.: 812-826.*
Giovanni Agosta, "High-Level Dataflow and Loop Optimization for High-Performance Parallel Computing through the SUIF Compiler", Nov. 27, 2000, retrieve from internet <http://www.elet.polimi.it/upload/agosta/ACA/optimization.pdf> on Sep. 11, 2004.*
"Improving the Ratio of Memory Operations to Floating-Point Operations in Loops", by Steve Carr and Ken Kennedy, ACM Transactions on Programming Languages and Systems, vol. 16, No. 6 Nov. 1994, pp. 1768-1810.*
Kainaga, M. et al., "A Fast Execution of Recurrrences on Superscalar Processors", Transactions of Information Processing Society of Japan, vol. 34, No. 12, pp. 2592-2598.

* cited by examiner

*Primary Examiner*—Meng-Al T. An
*Assistant Examiner*—Thanh T. Ha

(57) ABSTRACT

An optimization apparatus is capable of improving the execution efficiency of a loop that includes a loop carry dependency between consecutive iterations of the loop. For example, a value resulting from one iteration is used in an immediately following iteration. When the arithmetic expression "a[i+1]=a[i]*3+2;" is included in a loop body, and a value resulting from the arithmetic expression "a[i+1]=a[i]*3+2;" in one iteration is used in a following iteration, execution delays occur in pipeline processing of the loop. Here, the arithmetic expression "a[i+1]=a[i]*3+2;" is transformed into the arithmetic expression "a[i+4]=a[i]*81+80;" to expand the dependency distance. By doing so, the execution delays can be decreased.

14 Claims, 12 Drawing Sheets

```
for(i=0;i<=100;i++){
    a[i]=b[i]*(x+10)
}
```

```
for(i=0;i<=100;i+=2){
    a[i]=b[i]*(x+10)
    a[i+1]=b[i+1]*(x+10)
}
```

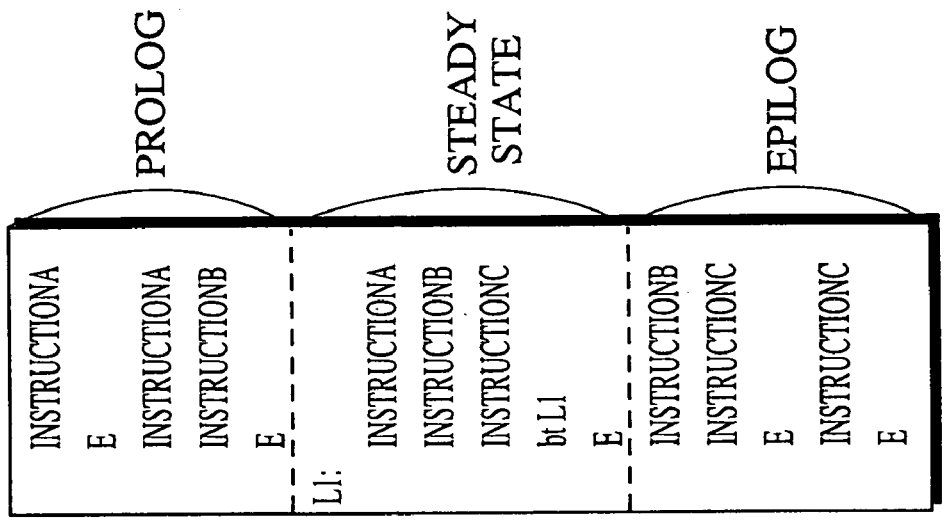
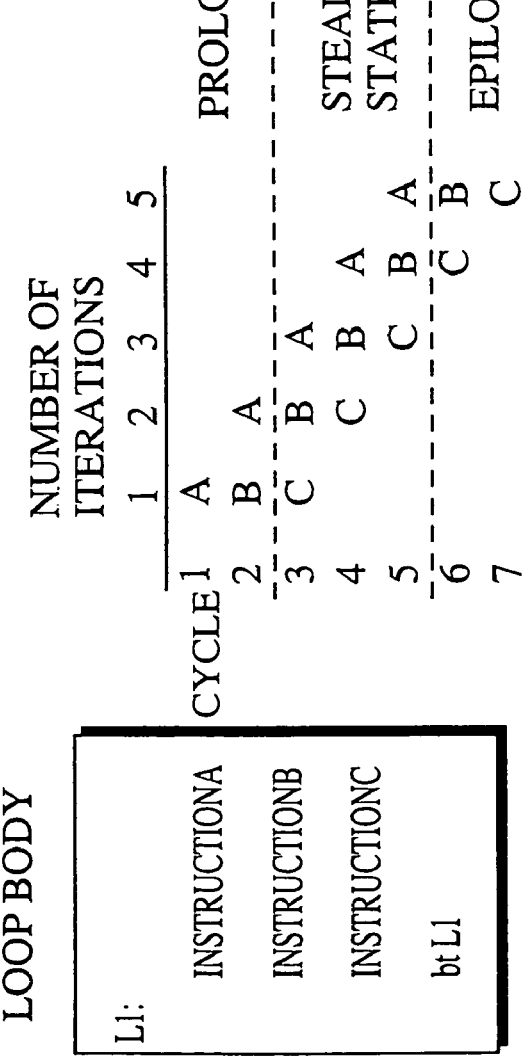

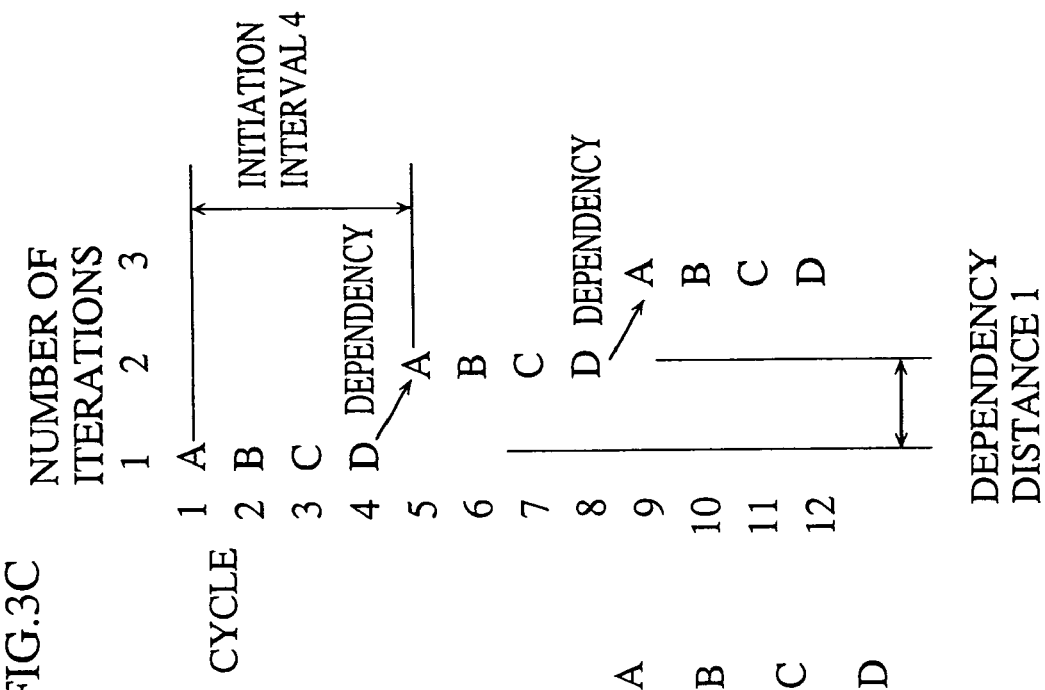

```
a[0] = x;
for (i = 0; i < 100; i++){
    a[i+1] = a[i] * 3 + 2;
}
```

FIG.6

GENERATION OF CARRY
DEPENDENCY INFORMATION

| | REFERENCING ARITHMETIC EXPRESSION | DEFINING ARITHMETIC EXPRESSION | DEPENDENCY DISTANCE | INITIATION INTERVAL |
|---|---|---|---|---|
| CARRY DEPENDENCY INFORMATION 1 | a[i+1]=a[i]*3+2 | SAME AS REFERENCING ARITHMETIC EXPRESSION | 1 | 4 |
| CARRY DEPENDENCY INFORMATION 2 | z=b[i]+x/50 | b[i+5]=320*z+y | 5 | 2 |
| CARRY DEPENDENCY INFORMATION 3 | s=a[i]+50*x | a[i+3]=s+y | 3 | 3 |
| CARRY DEPENDENCY INFORMATION 4 | b[j+3]=b[j]+13 | SAME AS REFERENCING ARITHMETIC EXPRESSION | 1 | 6 |
| | | | | |
| | | | | |

FIG. 9A $$a[i+1] = a[i]*3+2 \quad \ldots\ldots 701$$

SUBSTITUTE FOR $$a[i+2] = a[i+1]*3+2 \quad \ldots\ldots 702$$

$$a[i+2] = (a[i]*3+2)*3+2$$

$$= a[i]*9+8 \quad \ldots\ldots 703$$

SUBSTITUTE FOR $$a[i+3] = (a[i]*9+8)*3+2$$

$$= a[i]*27+26$$

$$a[i+4] = a[i]*81+80 \quad \ldots\ldots 704$$

FIG. 9B $$a[0] = x\,;\,a[1] = x*3+2\,;\,a[2] = x*9+8\,;\,a[3] = x*27+26\,;$$

for ( i = 1 ; i <= 100 i++ ) {

$$a[i+4] = a[i]*81+80\,; \text{------ }802$$

load a [i] , r0 --------- INSTRUCTION A mul 81 , r0 --------- INSTRUCTION B add 80 , r0 --------- INSTRUCTION C store r0 , a [i+4] ----- INSTRUCTION D UPDATE i

CONDITIONAL
    BRANCH TO L1

$a[i+1] = a[i]*3+2$ .....701

$a[i+1]+1 = (a[i]+1)*3$ .....705

$a[i+1]+1 = (a[i-1]+1)*3^2$ $a[i+1]+1 = (a[i-2]+1)*3^3$ $a[i+1]+1 = (a[0]+1)*3^{i+1}$ $a[i] = (a[0]+1)*3\wedge i - 1$ .....706

```
for ( i = 1 ; i <= 10 ; i++) {
    a[i] = (a[0]+1)*3^i-1 ;
}
```

|  | | NUMBER OF ITERATIONS | | | | | |
|---|---|---|---|---|---|---|---|
|  | | 1 | 2 | 3 | 4 | 5 | 6 |
| CYCLE | 1 | A | A | A | A | A | A |
|  | 2 | B | B | B | B | B | B |
|  | 3 | C | C | C | C | C | C |
|  | 4 | D | D | D | D | D | D |
|  | 5 | | | | | | |
|  | 6 | | | | | | |

OPTIMIZATION APPARATUS THAT DECREASES DELAYS IN PIPELINE PROCESSING OF LOOP AND COMPUTER-READABLE STORAGE MEDIUM STORING OPTIMIZATION PROGRAM

BACKGROUND OF THE INVENTION

1. Field of the Invention

The present invention relates to an optimization apparatus for use in a compiler that compiles a source program including loops with arithmetic expressions into an object program including instruction sequences, and a computer-readable storage medium that stores an optimization program. The present invention particularly relates to improvements in optimization techniques to generate codes for a processor that executes instructions in parallel.

2. Related Art

How to improve the execution efficiency of loop structures that use "for statements", "while statements", or the like has long been one of the subjects in the field of language processing.

Generally, a loop structure (hereafter referred to as a loop) is composed of (a) a control statement, such as a "for statement" or a "while statement", and (b) a body made up of at least one arithmetic expression. In loop processing, the body is repeatedly executed until the repeat condition prescribed by the control statement is satisfied. The run unit in the loop processing is called an iteration, and as many iterations as the number of repetition prescribed by the control statement are executed. For example, when the control statement indicates that the body of the loop is to be repeated 100 times, 100 iterations of the body of the loop are executed. Needless to say, executing some or all of the iterations in parallel can improve the execution efficiency of the loop. Optimization techniques, such as loop unrolling and software pipelining, are conventionally known to be effective in realizing parallelism within a loop.

Loop unrolling is an optimization technique that improves the execution efficiency of a loop, by converting an arithmetic expression included in the body of the loop into a plurality of arithmetic expressions. FIG. 1A shows a loop in which the arithmetic expression "a[i]=b[i]*(x+10)" that defines the element of the array "a" using the element of the array "b" is repeated until a variable "i" reaches 100. When loop unrolling is applied to the above loop, the arithmetic expression "a[i]=b[i]*(x+10)" in the loop body is transformed into two arithmetic expressions "a[i]=b[i]*(x+10)" and "a[i+1]=b[i+1]*(x+10)", as shown in FIG. 1B. The expression "i++" in FIG. 1A indicates that the induction variable "i" is incremented by 1 each time the loop is repeated, whereas the expression "i+=2" in FIG. 1B indicates that the induction variable "i" is incremented by 2 each time the loop is repeated.

In FIG. 1A, one array element of the array "a" is determined each time the loop is repeated. In FIG. 1B, however, each time the loop is repeated, the two arithmetic expressions "a[i]=b[i]*(x+10)" and "a[i+1]=b[i+1]*(x+10)" are executed in parallel, defining two array elements of the array "a".

Software pipelining is another optimization technique to improve the execution efficiency of a loop, by a compiler compiling the body of the loop into a machine instruction suitable for pipeline processing.

The following is an explanation of how software pipelining is applied, with reference to FIG. 2. FIG. 2A shows an example of a loop body which is composed of an instruction A, an instruction B, and an instruction C. It is assumed that these instructions cannot be executed in parallel as they have data dependency in the body of the loop. FIG. 2B shows an example where the instruction sequence shown in FIG. 2A is repeated five times in pipeline processing. In the figure, the vertical axis shows cycle, and the horizontal axis shows the number of iterations. In the figure, the horizontal axis shows the numbers 1 to 5, which means that five iterations are generated (hereafter referred to as a first iteration, a second iteration, a third iteration, a fourth iteration, and a fifth iteration).

During cycles 1 and 2, the instructions A and B in the first iteration and the instruction A in the second iteration are put in the pipeline. At this stage, no instruction in the third to fifth iterations is yet put in the pipeline. This stage is referred to as "prolog", where there is at least one iteration whose instruction is not put in the pipeline. During cycles 3 to 5, the instruction C in the first iteration, the instructions B and C in the second iteration, the instructions A to C in the third iteration, the instructions A and B in the fourth iteration, and the instruction A in the fifth iteration are put in the pipeline. This stage is referred to as "steady state". During cycles 6 and 7, the instruction C in the fourth iteration, the instructions B and C in the fifth iteration are put in the pipeline. This stage is referred to as "epilog", where the iterations of the loop are completed.

To execute the instructions in parallel as shown in FIG. 2B, the compiler outputs the sequence of machine instructions shown in FIG. 2C (machine instruction sequences are expressed by assembler codes in this specification). In the figure, the code "E" denotes an end bit, which indicates that instructions preceding the code "E" are executed in parallel. In the prolog, the first iteration is compiled into the instruction A and the end bit, and the second iteration is compiled into the instructions A and B and the end bit. In the epilog, the fifth iteration is compiled into the instruction C and the end bit, and the fourth iteration is compiled into the instructions B and C and the end bit.

In the steady state, the first through fifth iterations are compiled into the instructions A, B, C, the branch instruction "bt L1", and the end bit, describing that the instructions A, B, and C are repeated predetermined number of times.

By generating such instructions through software pipelining, the performance of the loop processing can be enhanced.

However, the above explained conventional techniques suffer from the following problems. Loop unrolling cannot be applied to a loop when iterations of the loop cannot be executed in parallel because of a carry dependency present between the iterations, making it impossible to accomplish the speed-up in the loop processing. In software pipelining, the execution efficiency of loop processing cannot be improved when a carry dependency exists between close iterations, like when a value resulting from one iteration is used in the following iteration.

Suppose software pipelining is applied to a source program shown in FIG. 3A. When the loop body in the source program in FIG. 3A is compiled into a sequence of instructions, the assembler codes shown in FIG. 3B are obtained. In the figure, the assembler code "load a[i], r0" is an instruction A to load an array element "a[i]" is loaded into "r0", the assembler code "mul 3, r0" is an instruction B to multiply a value of "r0" by 3, the assembler code "add 2, r0" is an instruction C to add 2 to the value of "r0", and the assembler code "store r0, a[i+1]" is an instruction D to store the value of "r0" into the array element "a[i+1]". Following this, the variable "i" is updated, and, a conditional branch to "L1" is performed using the value of "i" as a repeat condition (it should be noted here that the array element "a[i]" in the load instruction and the array element "a[i+1]" in the store instruction are expressed using variables in the source program for ease of explanation).

In this case, the load instruction of the instruction A loads a value from an address stored in the instruction D in the immediately preceding iteration. Therefore, the instruction A cannot be executed until the store instruction in the instruction D in the immediately preceding iteration is completed. Thus, even if software pipelining is applied to the source program in FIG. 3A, there is an execution delay of 4 cycles between the start of one iteration and the start of the following iteration, as shown in FIG. 3C.

SUMMARY OF THE INVENTION

The present invention aims to provide an optimization apparatus that is capable of decreasing delays in pipeline processing of a loop which has a carry dependency between close iterations of the loop, like when a value resulting from one iteration is used in an immediately following iteration. The present invention also aims to provide a computer-readable storage medium that stores an optimization program for the above purpose.

The object of the present invention can be achieved by an optimization apparatus that optimizes a program so as to be suitable for pipeline processing, the program including a loop structure composed of a body and a control statement, the body including at least one arithmetic expression, the control statement prescribing a repeat condition for the body, the optimization apparatus including: a detection unit for detecting a first arithmetic expression that defines a value in an i-th repetition of the body, the value being to be referred to in an (i+x)th repetition of the body, where i and x are positive integers; an estimation unit for estimating, based on a value of x, an execution delay that will occur when the body is repeatedly executed in pipeline processing; and a conversion unit for converting, when the execution delay exceeds a predetermined threshold level, the detected arithmetic expression into a second arithmetic expression that defines a value in the i-th repetition, the value being to be referred to in an (i+y)th repetition of the body, where y is an integer that is greater than x.

According the this construction, even when a carry dependency exists between close iterations of the loop, like when a value resulting from one iteration is used in an immediately following iteration, the conversion unit converts the loop in such a manner that a dependency distance between the iterations is expanded. By generating machine instructions for the converted loop through software pipelining, a plurality of iterations of the loop body can be executed rapidly in pipeline processing.

Also, the conversion unit converts only arithmetic expressions causing greater execution delays than the predetermined threshold level when a machine instruction for the body of the loop is repeatedly executed in pipeline processing, therefore, the increases in the code size that may be caused by the conversion of the loop can be minimized.

Here, the loop structure is for processing a sequence of numbers; a j-th value in the sequence of numbers is referred to in the i-th repetition, where j is a positive integer; a (j+m)th value in the sequence of numbers is referred to in the (i+x)th repetition; a (j+n)th value in the sequence of numbers is referred to in the (i+y)th repetition, where n and m are integers and n is greater than m; the first arithmetic expression detected by the detection unit is a first recurrence formula that defines the (j+m) th value by referring to the j-th value; and the second arithmetic expression converted by the conversion unit is a second recurrence formula that defines the (j+n)th value by referring to the j-th value.

According to this construction, it is possible to perform data processing of a sequence of numbers at high speed, the data processing being often performed for a loop written in a high-level language.

Here, the repeat condition prescribed by the control statement is expressed using an induction variable i, which is either incremented or decremented by a predetermined amount every time the body is repeated; the j-th value is stored in an array variable [i] that is specified by the induction variable i; the (j+m)th value is stored in an array variable [i+x] that is specified by a subscript expression i+x; and the value of x is a difference between the subscript expression i+x and the induction variable i.

In this case, the dependency distance can be calculated easily using the conventional subscript expression analysis technique.

Here, the detection unit further includes: a first detection unit for detecting a third arithmetic expression from the body of the loop, the third arithmetic expression defining the (j+m)th value and not referring to the j-th value; a second detection unit for detecting a fourth arithmetic expression from the body of the loop, the fourth arithmetic expression referring to the j-th value; and a combination unit for combining the third arithmetic expression with the fourth arithmetic expression, to obtain the first recurrence formula; wherein the conversion unit converts the first recurrence formula obtained by the combination unit into the second recurrence formula.

According to this construction, the transformation of a recurrence expression for the purpose of expanding the dependency distance is made possible even in a case where an arithmetic expression that defines a value in a sequence of numbers and an arithmetic expression that refers to a value in the a sequence of numbers are separately present in a source program.

The object of the present invention can also be achieved by an optimization apparatus for a loop structure composed of a body and a control statement, the body including at least one arithmetic expression, the control statement prescribing a repeat condition for the body, the optimization apparatus including: a judgement unit for judging whether a value to be defined by a first arithmetic expression in an i-th repetition of the body is referred to in an (i+x)th repetition of the body, where i and x are positive integers; and a conversion unit for converting, when the value is referred to in the (i+x)th repetition, the first arithmetic expression included in the body, into a second arithmetic expression that defines a value by only referring to a number of repetitions of the body.

According to the above construction, a dependency between iterations of the loop can be removed completely. With the use of loop unrolling, therefore, the best performance of loop processing can be achieved.

BRIEF DESCRIPTION OF THE DRAWINGS

These and other objects, advantages and features of the invention will become apparent from the following description thereoftaken in conjunction with the accompanying drawings that illustrate a specific embodiment of the invention. In the drawings:

FIG. 2A shows an example of a loop body;

FIG. 2B shows an example of the 3-stage pipeline in which an instruction sequence is repeated five times;

FIG. 2C shows assembler codes to repeat the instruction sequence five times;

FIG. 3A shows an example of a source program whose execution is not expected to be improved by software pipelining;

FIG. 3B shows assembler codes obtained by compiling the source program shown in FIG. 3A;

FIG. 3C shows an initiation interval and a dependency distance between iterations when the assembler codes in FIG. 3B are executed in pipeline processing;

FIG. 6 shows examples of carry dependency information;

FIG. 9A shows how a recurrence formula is transformed by the dependency distance expansion unit 404 for the purpose of expanding a dependency distance;

FIG. 9B shows an example of the source program converted using the transformed recurrence formula;

FIG. 9C shows a loop body including four instructions, namely, an instruction A, an instruction B, an instruction C, and an instruction D;

FIG. 12A shows an execution image when the recurrence formula shown in FIG. 11B is executed in loop unrolling;

FIG. 12B shows an execution image when an instruction sequence obtained by compiling the recurrence formula in FIG. 12A is executed in parallel;

DESCRIPTION OF THE PREFERRED EMBODIMENT

The following is an explanation of two embodiments of an optimization apparatus of the present invention, with reference to the drawings.

First Embodiment

Figures 1A, 1B:
FIG. 1A shows an example of a loop in which the arithmetic expression "a[i]=b[i]*(x+10)" that defines the element of the array "a" using the element of the array "b" is repeated until the variable "i" reaches 100.
FIG. 1B shows an example of the loop to which loop unrolling has been applied.
Figure 4:
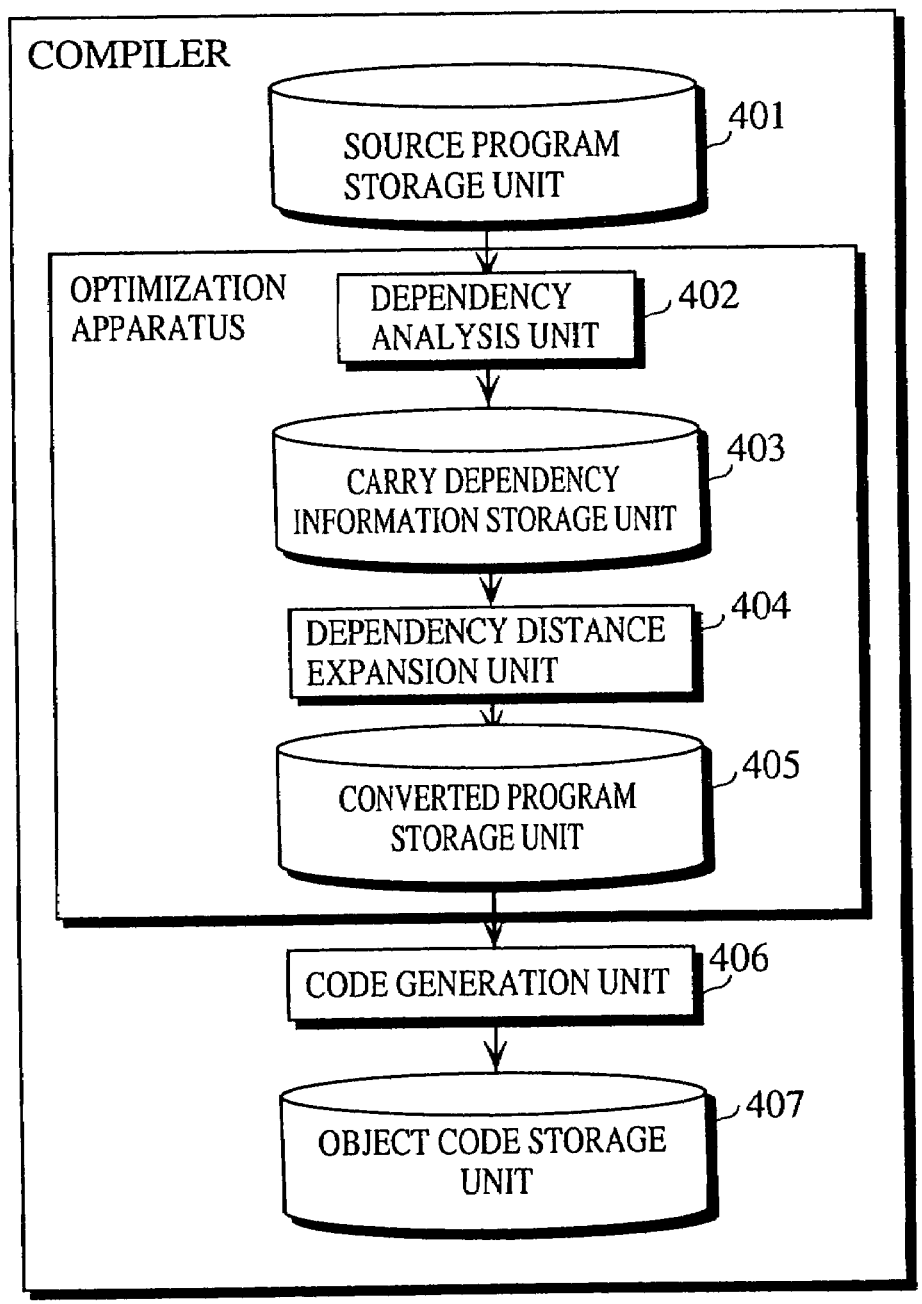
FIG. 4 shows an internal construction of a compiler equipped with an optimization apparatus of the first embodiment of the present invention.

FIG. 4 shows an internal construction of a compiler equipped with an optimization apparatus according to the first embodiment of the present invention. In the figure, the compiler is roughly composed of a source program storage unit 401, a dependency analysis unit 402, a carry dependency information storage unit 403, a dependency distance expansion unit 404, a converted program storage unit 405, a code generation unit 406, and an object code storage unit 407. Among these, the dependency analysis unit 402, the carry dependency information storage unit 403, the dependency distance expansion unit 404, and the converted program storage unit 405 constitute the optimization apparatus.

The source program storage unit 401 stores a source program. The source program includes a plurality of arithmetic expressions written according to the grammar of a high-level language. Each arithmetic expression defines a value of a variable on the left side of the mark "=", using operators and operands written on the right side of the mark "=". Each arithmetic expression is either placed in a body of at least one loop in which an array variable is processed, or placed outside the loop body. The repeat condition for each loop is determined by an induction variable, and each array element in the array variable is specified by a subscript expression.

Figures 5A, 5B:
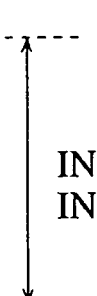
FIG. 5A shows an example of a source program in which array elements are defined.
FIG. 5B shows an instruction sequence obtained by compiling the source program in FIG. 5A, the instruction sequence expressed by assembler codes.

FIG. 5A shows an example of a source program, in which the expression "a[0]=x;" at the first line indicates that the $0^{th}$ array element of the array "a" equates a value of the variable "x". The "for statement" at the following line is a control statement that prescribes the repeat condition of the loop in which each of the $1^{st}$ to $99^{th}$ array elements is defined. As can be seen from the description "for(i=0;<100;i++)", an initial value for the induction variable "i" is 0, and the expression "i++" indicates that the value of the induction variable "i" is incremented by 1 every time one loop iteration is run. The expression "i<100" indicates that the body of the loop is repeated 100 times. Also, each subscript expression that specifies an array element includes the induction variable "i".

The carry dependency information storage unit 403 stores a plurality of sets of carry dependency information, each set of information showing a loop carry dependency present in the source program. It should be noted here that the "loop carry dependency" is referred to as a dependency between iterations of the loop, and is not referred to as a dependency between instructions in the loop body. More specifically, the loop carry dependency is a dependency that appears when a value resulting from an arithmetic expression in a current iteration is referred to by an arithmetic expression in an iteration following the current iteration. When such a dependency is present, the arithmetic expression that refers to the value is not allowed to be executed before the completion of the arithmetic expression that defines the value.

Carry dependency information shows a loop carry dependency for each pair comprising (a) an arithmetic expression that refers to an array element (hereafter referred to as a "referencing arithmetic expression") and (b) an arithmetic expression that defines the array element (hereafter referred to as a "defining arithmetic expression"). The carry dependency information includes a "referencing arithmetic expression", a "defining arithmetic expression", a "dependency distance", and an "initiation interval".

The term "dependency distance" is used to refer to the number of iterations present between two iterations that respectively include dependent instructions when the loop carry dependency exists between the two iterations.

The term "initiation interval" is used to refer to an interval between the start of one iteration and the start of the following iteration. This represents one type of delay in pipeline processing. The shorter the interval, the better the execution efficiency of a loop, when the loop is executed in pipeline processing.

As examples of carry dependency information, FIG. 6 shows four sets of carry dependency information 1, 2, 3, and 4. A referencing arithmetic expression in the carry dependency information 1 is "a[i+1]=a[i]*3+2", which coincides with its defining arithmetic expression. The dependency distance between the referencing arithmetic expression and the defining arithmetic expression is "1" and the initiation interval is "4" (for unification of expression, even when the referencing arithmetic expression coincides with the defining arithmetic expression, these are referred to as a pair of arithmetic expressions).

As for the carry dependency information 2, the referencing arithmetic expression is "z=b[i]+x/50" and the defining arithmetic expression is "b[i+5]=320*z+y". This means that a loop carry dependency is present between the different arithmetic expressions.

The dependency analysis unit 402 analyzes the source program stored in the source program storage unit 401. More specifically, the dependency analysis unit 402 analyzes a subscript expression of an array in a loop included in the source program, and judges whether a loop carry dependency is present between iterations of the loop. When the dependency analysis unit 402 judges that a loop carry dependency exists, it generates carry dependency information showing details of the loop carry dependency, and writes the generated carry dependency information into the carry dependency information storage unit 403. A functional entity of the dependency analysis unit 402 is a program to perform the procedures in a flowchart in FIG. 7. The following is an explanation of an operation of the dependency analysis unit 402 with reference to the flowchart shown in FIG. 7. A subscript expression analysis for analyzing a subscript expression of an array described in "*Supercompilers for Parallel and Vector Computers* (Ohmsha, Ltd.)" is applied to the analysis of a loop carry dependency in this flowchart.

Step S1 as well as step S2 show a loop control statement to execute processing from step S3 through step S10 for each loop included in the source program. For example, when the source program includes a plurality of loops written using "for statements" or "while statements", the processing from step S3 to step S10 is executed for each of the plurality of loops.

In step S3, a judgement is performed as to whether the present loop includes an arithmetic expression that defines array elements. If the above judgement result is negative, the processing skips over steps S5 to S10, and advances to step S2. Otherwise, the processing moves on to step S4.

In step S4, a judgement is performed as to whether a loop carry dependency is present between iterations of the present loop. More specifically, the judgement is performed as to whether the array element defined in one iteration is used in a following iteration of the present loop. When the array element is defined in one iteration of the loop but is not used in any following iteration, the dependency analysis unit 402 judges that the loop carry dependency is not present. Accordingly, the processing skips over steps S5 to S10, and advances to step S2.

When the loop carry dependency is judged to be present between iterations of the present loop, the processing moves onto step S5. Instep S5, a judgement is performed as to whether an array element in a defining arithmetic expression is specified by a subscript expressed by a linear expression of an induction variable. When the array element in the defining arithmetic expression is specified by a subscript expressed by a non-linear expression of an induction variable, a dependency distance is undefined, and so the subscript expression analysis cannot be applied to the present loop. Therefore, the processing skips over steps S6 to S10, and advances to step S2. When the array element in the defining arithmetic expression is specified by a subscript expressed by a linear expression of an induction variable, the processing moves on to step S6.

Instep S6, a judgement is performed as to whether an array element in a referencing expression is specified by a subscript expressed by a linear expression of an induction variable. When the array element in the referencing arithmetic expression is specified by a subscript expressed by a non-linear expression of an induction variable, the subscript expression analysis cannot be applied to the present loop, and so the processing skips over step S6 to step S10, and advances to step S2.

In step S7, a displacement from the subscript expression in the defining arithmetic expression to the subscript expression in the referencing arithmetic expression is calculated based on the linear expressions of both the subscript expressions. In case of an arithmetic expression "a[i+1]=a[i]*3+2;", the subscript expression in its defining arithmetic expression is "i+1", and the subscript expression in its referencing arithmetic expression is "i", therefore, the displacement is calculated as "1", with which the dependency distance "1" is obtained.

In step S8, statements between the defining arithmetic expression and the referencing arithmetic expression are temporarily replaced with an instruction sequence, so that the number of instructions from (a) the instruction to define the array element to (b) the instruction to refer to the array element in the instruction sequence can be estimated.

In step S9, an initiation interval is calculated based on the obtained dependency distance and the estimated number of instructions. FIG. 5B shows an instruction sequence (expressed by assembler codes) that can be obtained by compiling the source program shown in FIG. 5A. Here, the arithmetic expression "a[i+1]=a[i]*3+2;" indicates that the array element "a[i]" is multiplied by 3, to which 2 is added, and the resulting value is substituted for the array element "a[i+1]". To realize this by an instruction sequence, it is estimated that the arithmetic expression "a[i+1]=a[i]*3+2;" is compiled into an instruction sequence, so that assembler codes shown in FIG. 5B are obtained. In the figure, the assembler "load a[i], r0" is an instruction to load a value of the array element "a[i]" into "r0". The assembler code "mul 3, r0" is an instruction to multiply the value of "r0" by 3, the assembler code "add 2 r0" is an instruction to add 2 to the value of "r0", and the assembler code "store r0, a[i+1]" is an instruction to store the value of "r0" into the array element "a[i+1]". As can been seen from FIG. 5B, the number of instructions from (a) the instruction to define an array element to (b) the instruction to refer to the array element in the machine program is calculated as 4. As can also been seen from FIG. 5B, after the initiation of the first loop iteration, four instructions are executed to finally define the array element "a[1]". As the first instruction in the second iteration requires the array element "a[1]", the second iteration can be initiated only after the instruction "store r0, a[i+1]" in the first iteration has been completed. From this, the initiation interval for the present loop is calculated as 4.

In step S10, the dependency analysis unit 402 writes, as one set of carry dependency information, (1) the defining arithmetic expression, (2) the referencing arithmetic expression, (3) the calculated dependency distance, and (4) the calculated initiation interval, in correspondence with each other, into the carry dependency information storage unit 403. The processing then advances to step S2, and the above explained processing is repeated for the rest of loops included in the source program.

The dependency distance expansion unit 404 (a) transforms each pair of arithmetic expressions included in a loop in the source program stored in the source program storage unit 401 for the purpose of expanding the dependency distance in the loop, (b) converts the source program using the resulting pair of arithmetic expressions, and (c) writes the converted program into the converted program storage unit 405. A functional entity of the dependency distance expansion unit 404 is a program to perform the procedures in a flowchart in FIG. 8. The following is an explanation of an operation of the dependency distance expansion unit 404 with reference to the flowchart shown in FIG. 8.

Step S20 as well as step S21 show a loop control statement to execute processing from step S22 to step S30 for each set of carry dependency information.

In step S22, a judgement is performed as to whether an initiation interval included in the present set of carry dependency information is a minimum value. When the above judgement result is negative, the processing moves on to step S23. When the above judgement result is positive, the processing advances to step S21 to process another set of carry dependency information. It is assumed that the minimum value of the initiation interval in the present embodiment is "1". The carry dependency information 1 including the arithmetic expression "a[i+1]=a[i]*3+2;" shown in FIG. 5A indicates that the initiation interval is "4", which is not the minimum value "1". Therefore, the processing moves on to step S23.

In step S23, a defining arithmetic expression and a referencing arithmetic expression in one pair shown by the present set of carry dependency information are combined, so that a recurrence formula that defines the array element a[i+d] using the array element a[i] as an operand is obtained. In case where the present set of carry dependency information includes the arithmetic expression "a[i+1]=a[i]*3+2;" shown in FIG. 5A, the defining arithmetic expression coincides with the referencing arithmetic expression. Also, the arithmetic expression is originally written as a recurrence formula, therefore the above explained transformation is not executed for the present set of carry dependency information in the present step. The displacement in the recurrence formula "a[i+1]=a[i]*3+2;" is calculated as "1".

In step S24, a set point of the dependency distance is calculated, and the displacement "d" is substituted for the variable "x". The set point of the dependency distance is obtained by multiplying the dependency distance by the initiation interval. The variable "x" shows a counter value for the dependency distance in the process of expanding the dependency distance. In step S24, the displacement "d" is substituted for the variable "x". When the present set of carry dependency information is carry dependency information 1 in FIG. 6, the dependency distance is 1, and the initiation interval is 4. Therefore, the set point of the dependency distance is calculated as "4".

Processing from step S25 to step S28 is to perform, so called, the "transformation of a recurrent formula".

In step S25, the displacement "d" is added to subscript expressions in both sides of the recurrent formula that defines the array element "a[i+x]" using the array element "a[i]" as an operand, so as to obtain a recurrent formula that defines the array element "a[i+x+d]" using the array element "a[i+d]" as an operand. When the present set of carry dependency information includes the arithmetic expression "a[i+1]=a[i]*3+2;" shown in FIG. 5A, the displacement "1" is added to the subscript expression in the right part and the subscript expression in the left part, so that the resulting arithmetic expression 702 "a[i+2]=a[i+1]*3+2;" is obtained as shown in FIG. 9A.

In step S26, substituting (a) the arithmetic expression that refers to the array element "a[i]" into (b) the array element "a[i+d]" that is used as an operand in the recurrent formula obtained in Step S25 yields a recurrent formula that defines the array element "a[i+x+d]" using the array element "a[i]" as an operand.

As one example, when the arithmetic expression 702 "a[i+2]=a[i+1]*3+2;" is obtained in step S25, the arithmetic expression 702 is transformed in the following way. The arithmetic expression 701 "a[i+1]=a[i]*3+2;" is first substituted into the arithmetic expression 702 "a[i+2]=a[i+1]*3+2;", so that the arithmetic expression 702 is transformed into "a[i+2]=(a[i]*3+2)*3+2;", and then into "a[i+2]=a[i]*9+2*3+2;", and the resulting arithmetic expression 703 "a[i+2]=a[i]*9+8;" is obtained.

After the arithmetic expression has been transformed in step S25, the processing moves on to step S27. In step S27, the variable "x" is incremented by a value of the displacement "d" (x←x+d). In the example shown in FIG. 9, the variable "x" is updated to 2 (2←1+1) when the arithmetic expression 703 "a[i+2]=a[i]*9+8;" is obtained.

When the dependency distance has been incremented, the processing moves on to step S28. In step S28, a judgement is performed as to whether the variable "x" has reached the set point of the dependency distance. When the above judgement result is positive, the processing moves on to step S29. Otherwise, the processing returns to step S25. In the example shown in FIG. 9, as the set point of the dependency distance is "4", it is judged that the variable "x" has not reached the set point of the dependency distance in step S28, so that the processing returns to step S25.

When the processing returns to step S25, a value "1" of the displacement "d" is added to subscript expressions in both sides of the arithmetic expression 703 "a[i+2]=a[i]*9+8;", yielding the arithmetic expression "a[i+3]=a[i+1]*9+8;". In the following step S26, the arithmetic expression 701 "a[i+1]=a[i]*3+2;" is substituted into the arithmetic expression "a[i+3]=a[i+1]*9+8;".

The resulting arithmetic expression "a[i+3]=(a[i]*3+2)*9+8;" is obtained. Accordingly, the arithmetic expression "a[i+3]=(a[i])*27+26;" is obtained. After the arithmetic expression has been transformed, the processing moves onto step S27 where the variable "x" is updated to 3. When the dependency distance has been incremented, the judgement is performed as to whether the variable "x" reaches the set point of the dependency distance in step S28. When the above judgement result is negative, the processing returns to step S25.

When the processing again returns to step S25, a value "1" of the displacement "d" is added to subscript expressions in both sides of the arithmetic expression "a[i+3]=a[i]*27+26;", yielding the arithmetic expression "a[i+4]=a[i+1]*27+26;". In step S26, the arithmetic expression 701 "a[i+1]=a[i]*3+2;" is substituted into the arithmetic expression "a[i+4]=a[i+1]*27+26;", so that the resulting arithmetic expression "a[i+4]=(a[i]*3+2)*27+26;" is obtained. Accordingly, the arithmetic expression 704 "a[i+4]=a[i]*81+80;" is obtained. After the arithmetic expression has been transformed as explained above, the processing moves on to step S27, and the variable "x" is updated to 4. When the dependency distance has been incremented, the judgement is performed as to whether the variable "x" has reached the set point 4 of the dependency distance in step S28, and as the judgement result is positive, the processing moves on to step S29.

In step S29, the dependency distance expansion unit 404 converts the source program stored in the source program storage unit 401 by replacing the original referencing arithmetic expression and the defining arithmetic expression by the obtained referencing arithmetic expression that refers to the array element a[i] and the obtained defining arithmetic expression that defines the array element a[i+x]. The dependency distance expansion unit 404 stores the converted source program into the converted program storage unit 405.

In step S30, when an initial value of "i" is "Init", the dependency distance expansion unit 404 generates arithmetic expressions that respectively define the array elements a[Init] to a[Init+x−1] in the source program. In the program shown in FIG. 5A, a value of "Init" is 0, and the arithmetic expression "a[0]=x;" that defines the array element a[0] is originally in the source program. Thus, in step S29, the arithmetic expressions "a[1]=x*3+2;", "a[2]=x*9+2;", and "a[3]=x*27+26;" that respectively define the array elements a[1], a[2], and a[3] are generated in the source program. The processing is complete for the present set of carry dependency information. The processing explained above is repeated for the rest of sets of carry dependency information.

The code generation unit 406 parses each converted program that has been stored into the converted program storage unit 405, and subjects the converted program to the optimization, such as software pipelining, for the purpose of making the program suitable for a target machine. Following this, the optimized program is compiled into a machine program and written into the object code storage unit 407. It should be noted here that the target machine is a processor that includes an instruction memory, a program counter, an instruction fetch circuit, an instruction register, an instruction decoder, an operational circuit, a general register, a data memory, buses for transferring data and address, and the like. The processor may issue a single instruction at one time, or a plurality of instructions simultaneously. The length of each instruction may either be variable or fixed. In the present embodiment, a processor that is capable of issuing four instructions simultaneously is used as one example. It is assumed that the target machine in the present embodiment is capable of executing each instruction per one cycle (even though an instruction that cannot be executed per one cycle exists, the present method is applicable). As one example, the code generation unit 406 generates codes suitable for the target machine, so that the instruction sequence shown in FIG. 9C is obtained. The instruction sequence in FIG. 9C includes four instructions an instruction A; an instruction B; an instruction C; an instruction D; expressed by assembler codes. In the figure, the assembler code "load a[i], r0" is the instruction A to load a value of the array element "a[i]" into "r0", the assembler code "mul 81, r0" is the instruction B to multiply the value of "r0" by 81, the assembler code "add 80, r0" of is the instruction C to add 80 to the value of "r0", and the assembler code "store r0, a[i+4]" is the instruction D to store the value of "r0" in the array element "a[i+4]".

Figure 10:
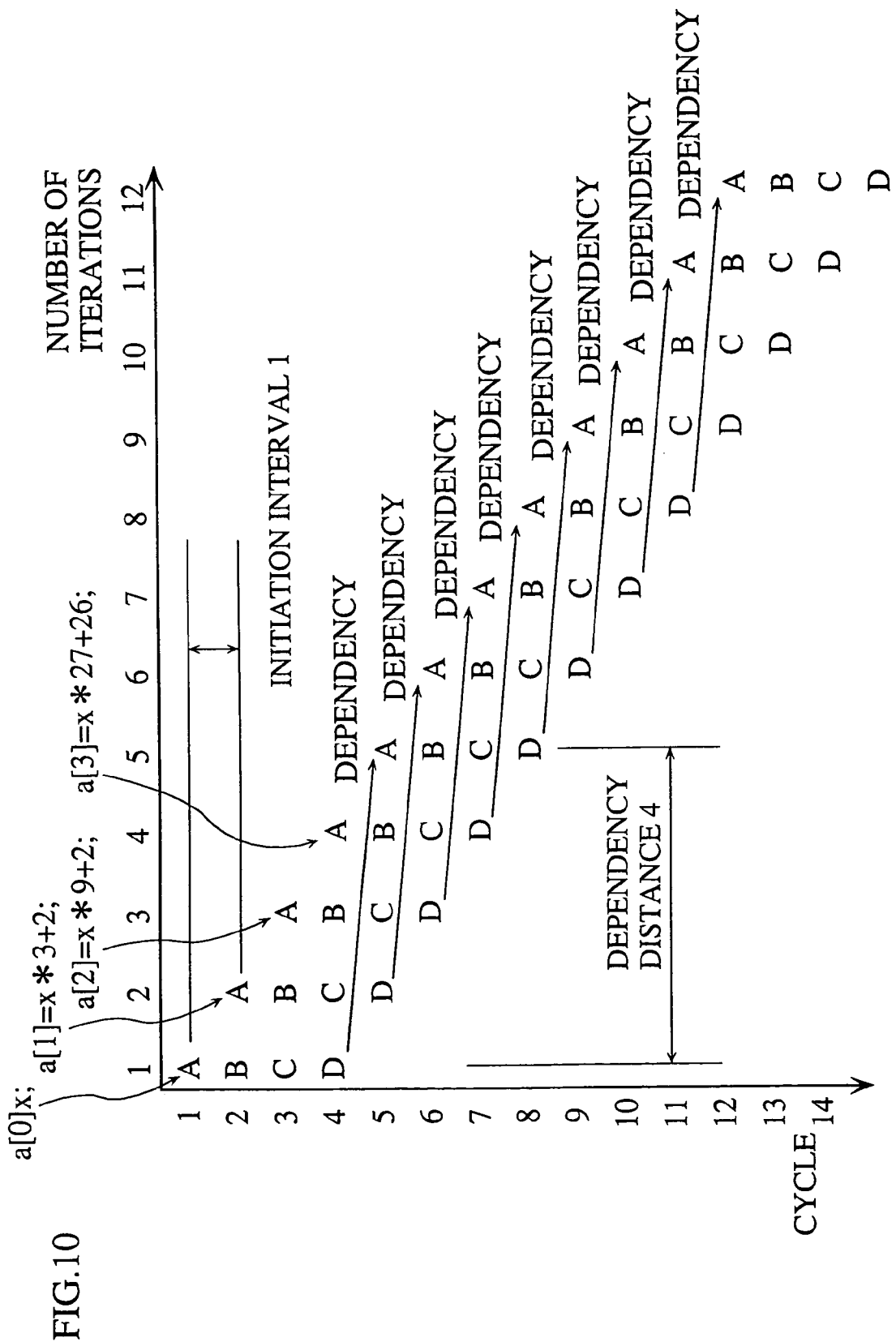
FIG. 10 shows an execution image when the instruction sequence shown in FIG. 9C is executed in pipeline processing.

FIG. 10 shows an execution image of the above assembler codes in pipeline processing. As the dependency distance of the loop carry dependency has been expanded from 1 to 4, the first iteration defines the array element "a[5]" that is to be referred to in the fifth iteration. The second iteration defines the array element "a[6]" that is to be referred to in the sixth iteration, the third iteration defines the array element "a[7]" that is to be referred to in the seventh iteration, and the fourth iteration defines the array element "a[8]" that is to be referred to in the eighth iteration.

In the first iteration, the instruction "load a[i], r0" refers to the array element "a[0]". In the second iteration, the instruction "load a[i], r0" refers to the array element "a[1]". In the third iteration, the instruction "load a[i], r0" refers to the array element "a[2]". In the fourth iteration, the instruction "load a[i], r0" refers to the array element "a[3]". As the arithmetic expressions that respectively define the array elements "a[1]", "a[2]", and "a[3]" exits outside the loop, the second iteration, the third iteration, the fourth iteration do not have to wait for each of the above array elements to be defined in a preceding iteration. As the second iteration, the third iteration, and the fourth iteration, each do not have a loop carry dependency with the first iteration, they can be sequentially executed with the initiation interval 1 between two consecutive iterations.

As explained above, according to the present embodiment, even when a loop in which a value resulting from one iteration is used in an immediately following iteration is executed, the loop can be transformed so that the dependency distance between the iterations of the loop is expanded. Therefore, by generating machine instructions for the transformed loop through software pipelining, a plurality of iterations of the body of the loop can be executed more rapidly in pipeline processing. As one example, when a loop is written so as to repeat the body of the loop s times, with the initiation interval of 4, it requires s*4 cycles to complete the s iterations of the loop when the dependency distance is as it is. However, by expanding the dependency distance as explained in the present embodiment, the initiation interval can be converted into 1, so that it only requires 3+s cycles to complete the s iterations of the loop. For instance, when s=100, it requires 400 cycles to complete the s iterations of the loop. By expanding the dependency distance, however, it only requires 103 cycles to complete the s iterations of the loop.

Second Embodiment

The dependency distance expansion unit 404 in the first embodiment expands the distance of the loop carry dependency, however, the dependency distance expansion unit 404 in the second embodiment executes the following processing to remove the loop carry dependency.

Figures 11A, 11B:
FIG. 11A shows how the recurrence formula is transformed by the dependency distance expansion unit 404 for the purpose of expanding the dependency distance in the second embodiment of the present invention.
FIG. 11B shows an example of the source program converted using the transformed recurrence formula.

The dependency distance expansion unit 404 in the second embodiment transforms the arithmetic expression 701 "a[i+1]=a[i]*3+2;" as shown in FIG. 11A. The following is an explanation of the transformation. The arithmetic expression 701 "a[i+1]=a[i]*3+2;" in the loop is first transformed into the arithmetic expression 705 "a[i+1]+1=(a[i]+1)*3;". The transformed arithmetic expression 705 shows that the array element "a[i+1]+1" in the left part equates the array element "a[i]+1" multiplied by 3 in the right part. The arithmetic expression 705 "a[i+1]+1=(a[i]+1)*3;" relates to a geometrical progression with the initial value "a[0]+1" and the common ratio 3. Therefore, substituting the arithmetic expression "a[i]+1=(a[i−1]+1)*3;" into the arithmetic expression 705 "a[i+1]+1=(a[i]+1)*3;" yields the arithmetic expression "a[i+1]+1=((a[i−1]+1)*3)*3;". Substituting the arithmetic expression "a[i−1]+1=(a[i−2]+1)*3;" into the arithmetic expression "a[i+1]+−1=((a[i−1]+1)*3)*3;" yields the arithmetic expression "a[i+1]+1=(((a[i−2]+1)*3)*3) *3;". By repeating the above processing, the arithmetic expression "a[i+1]=(a[0]+1)*3^i;" is obtained. As a result, the i-th array element of the array "a" can be calculated using the arithmetic expression 706 "a[i]=(a[0]+1)*3^i−1".

The dependency distance expansion unit 404 writes the converted program shown in FIG. 11B into the converted program storage unit 405.

As a converted program in the converted program storage unit 405 includes a non-recurrence formula that defines the i-th element of the array "a" using the induction variable "i", a loop carry dependency has been removed. Therefore, for executing the converted program, the first iteration, the second iteration, the third iteration, the fourth iteration, . . . and the following iterations can be executed simultaneously in parallel.

FIG. 12B shows iterations of an instruction sequence obtained by compiling the arithmetic expression 706 "a[i]=(a[0]+1)*3^i-1;". The instruction sequence includes an instruction A, an instruction B, an instruction C, and an instruction D. As there is no loop carry dependency, these six iterations are executed simultaneously in parallel. This means that loop unrolling becomes applicable due to the above explained transformation of the arithmetic expression. As a result of this, 10 elements of the array "a" can be defined simultaneously if there is no resource constraint of the processor. However, in the above case, the calculation of raising a value to an i-th power ("i" is an induction variable) is necessary. When the architecture of the target machine does not allow rapid execution of such a calculation, the operation load might be rather heavier.

Modifications

Although the present invention has been described based on the above two embodiments, the invention should not be limited to such. For instance, the following modifications (a), (b), and (n) are possible.

(a) The above two embodiments explain a case in which an arithmetic expression in a loop includes the one-dimensional array where an array element is specified by one variable. However, shortening of the iteration initiation interval of the loop is also possible in other cases in which the arithmetic expression in the loop includes (a) the two-dimensional array where an array element is specified by two variables, or (b) the three-dimensional array where an array element is specified by three variables, as long as the recurrence formula can be transformed in the above explained way.

As one example, the following is a case where the dependency distance expansion unit 404 processes an array element specified by two variables "i" and "j". It is assumed that a value of the array element "c[i,j]" specified by the variables "i" and "j" is calculated by the recurrence formula "c[i+1,j]=c[i,j]*3+2;" included in a loop. First, a displacement "1" is added to both sides of the recurrence formula, so that the recurrence formula "c[i+2,j]=c[i+1,j]*3+2;" is obtained. Substituting the recurrence formula "c[i+1,j]=c[i,j]*3+2;" into the recurrence formula "c[i+2,j]=c[i+1,j]*3+2;" yields the recurrence formula "c[i+2,j]=c[i,j]*9+8;".

Figure 8:
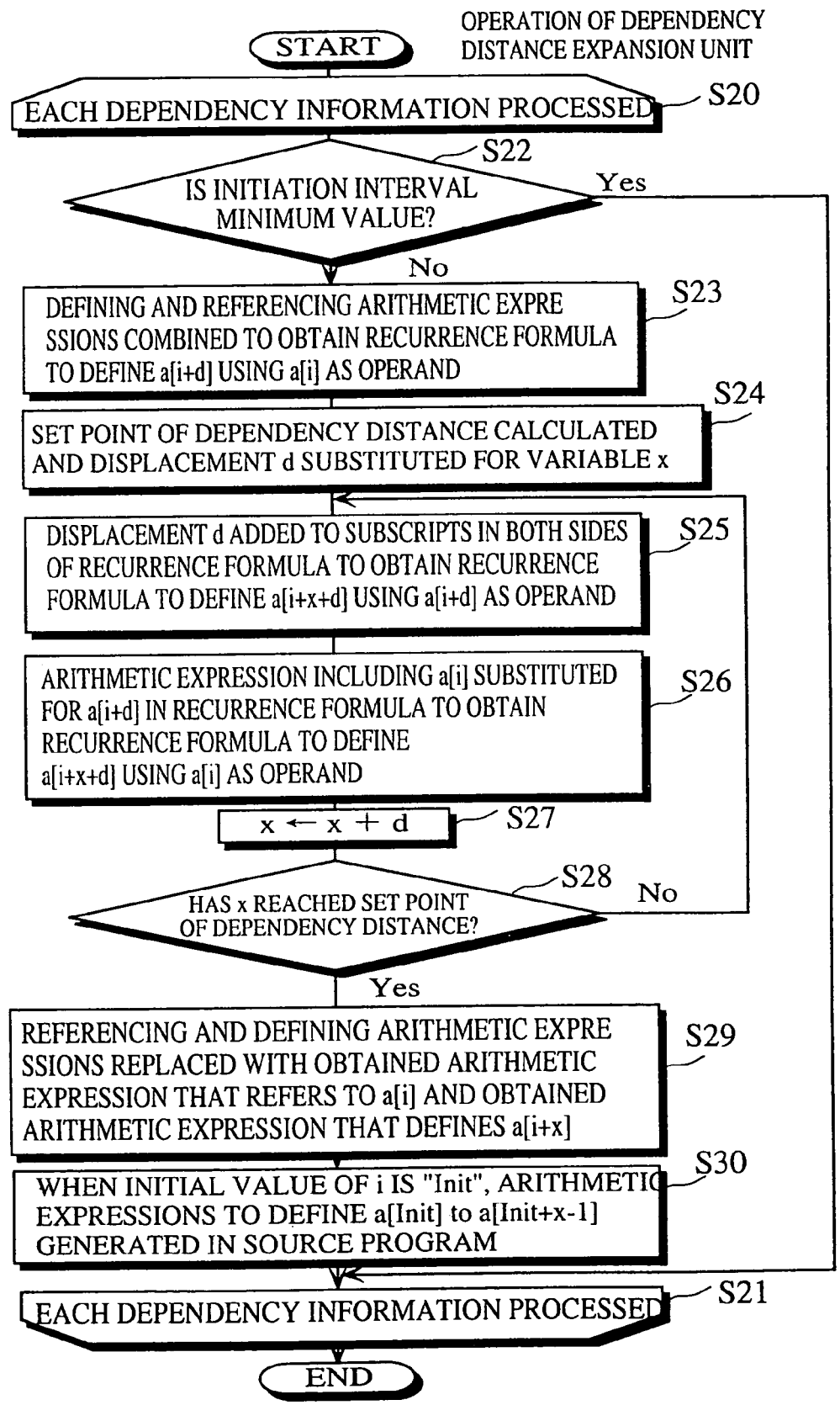
FIG. 8 is a flowchart showing an operation of a dependency distance expansion unit 404.

The processing here returns to step S25 with reference to the flowchart in FIG. 8, and the displacement "1" is added to both the sides of the recurrence formula "c[i+2,j]=c[i,j]*9+8;", so that the recurrence formula "c[i+3,j]=c[i+1,j]*9+8;" is obtained. Substituting the recurrence formula "c[i+1,j]=c[i,j]*3+2;" into the recurrence formula "c[i+3,j]=c[i+1,j]*9+8;" yields the recurrence formula "c[i+3,j]=(c[i,j]*3+2)*9+8;", accordingly, the recurrence formula "c[i+3,j]=c[i,j]*27+26;" is obtained.

The processing again returns to step S25, where the displacement "d" is added to both sides of the recurrence formula "c[i+3,j]=c[i,j]*27+26;", so that the recurrence formula "c[i+4,j]=c[i+1,j]*27+26;" is obtained, into which the recurrence formula "c[i+1,j]=c[i,j]*3+2;" is substituted, so that the recurrence formula "c[i+4,j]=(c[i,j]*3+2)*27+26;" is obtained. Accordingly, the recurrence formula "c[i+4,j]=c[i,j]*81+80;" is obtained.

As explained above, even in case where the three-dimensional array where an array element is specified by three variables is processed in a loop, the recurrence formula "c[i+1,j]=c[i,j]*3+2;" can be transformed in the above explained way, so that the iteration initiation interval in the loop processing can be shortened.

(b) The optimization apparatus of the present invention may be equipped in the compiler as a preprocessor.

Figure 7:
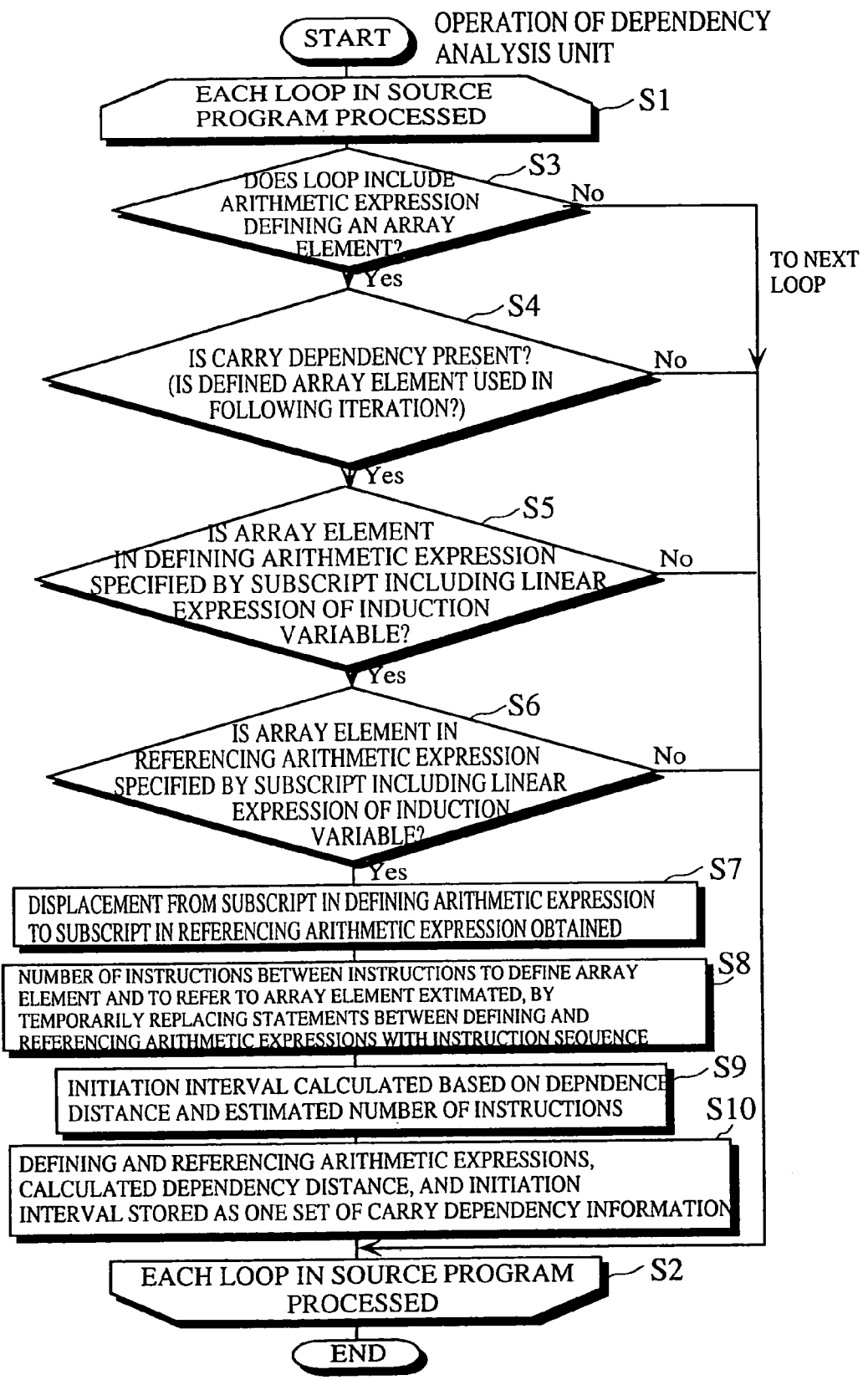
FIG. 7 is a flowchart showing an operation of a dependency analysis unit 402.

(c) The procedures explained with reference to the flowcharts in FIGS. 7 and 8 may be realized by an execute form program, and the execute form program may be stored in a storage medium for distribution or for sale. The storage medium can be an IC card, an optical memory disk, or a floppy disk. The execute form program stored in any of the above listed storage media is installed in a general computer for use. The general computer executes the installed execute form program so that the function of the optimization apparatus of the present invention is realized.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optimization apparatus comprising:
a first storage means for storing a program including a loop structure composed of a body and a control statement, the body including at least one arithmetic expression and the control statement prescribing a repeat condition for the body;
a detection means for reading the program stored in the first storage means and detecting from the read program a first arithmetic expression that defines a value in an i-th repetition of the body, the value being to be referred to in an (i+x)th repetition of the body, where i and x are positive integers;
an estimation means for estimating, based on a value of x, an execution delay that will occur when the body is repeatedly executed in pipeline processing;
a second storage means; and
a conversion means for converting, when the execution delay exceeds a predetermined threshold level, the detected arithmetic expression into a second arithmetic expression that defines a value in the i-th repetition, and writing a program that includes the second arithmetic expression in place of the first arithmetic expression to the second storage means, the value being to be referred to in an (i+y)th repetition of the body, where y is an integer that is greater than x.

2. The optimization apparatus of claim 1, wherein:
the loop structure is for processing a sequence of numbers;
a j-th value in the sequence of numbers is referred to in the i-th repetition, where j is a positive integer;
a (j+m)th value in the sequence of numbers is referred to in the (i+x)th repetition;
a (j+n)th value in the sequence of numbers is referred to in the (i+y)th repetition, where n and m are integers and n is greater than m;

the first arithmetic expression detected by the detection means is a first recurrence formula that defines the (j+m)th value by referring to the j-th value; and the second arithmetic expression converted by the conversion means is a second recurrence formula that defines the (j+n)th value by referring to the j-th value.

3. The optimization apparatus of claim 2, wherein:

the repeat condition prescribed by the control statement is expressed using an induction variable i, which is either incremented or decremented by a predetermined amount every time the body is repeated;

the j-th value is stored in an array variable [i] that is specified by the induction variable i;

the (j+m)th value is stored in an array variable [i+x] that is specified by a subscript expression i+x; and the value of x is a difference between the subscript expression i+x and the induction variable i.

4. The optimization apparatus of claim 3, wherein the estimation means includes:

a first calculation unit for calculating a number of instructions from (a) an instruction to refer to the j-th value to (b) an instruction to define the (j+m) value, if the first recurrence formula is replaced with a sequence of machine instructions; and a second calculation unit for calculating the execution delay, by multiplying the calculated number of instructions by the value of x.

5. The optimization apparatus of claim 4, wherein a value of y is the execution delay calculated by the second calculation unit; the (j+n)th value is stored in an array variable [i+y] that is specified by a subscript expression i+y; and the second recurrence formula converted by the conversion means defines the array variable [i+y] by referring to the array variable [i].

6. The optimization apparatus of claim 2, wherein the detection means further includes:

a first detection unit for detecting a third arithmetic expression from the body of the loop, the third arithmetic expression defining the (j+m)th value and not referring to the j-th value;

a second detection unit for detecting a fourth arithmetic expression from the body of the loop, the fourth arithmetic expression referring to the j-th value; and a combination unit for combining the third arithmetic expression with the fourth arithmetic expression, to obtain the first recurrence formula;

wherein the conversion means converts the first recurrence formula obtained by the combination unit into the second recurrence formula.

7. An optimization apparatus comprising:

a first storage means for storing a program including a loop structure composed of a body and a control statement, the body including at least one arithmetic expression and the control statement prescribing a repeat condition for the body;

a judgement means for reading the program stored in the first storage means and judging based on the read program whether a value to be defined by a first arithmetic expression in an i-th repetition of the body is referred to in an (i+x)th repetition of the body, where i and x are positive integers;

a second storage means; and a conversion means for converting, when the value is referred to in the (i+x)th repetition, the first arithmetic expression included in the body, into a second arithmetic expression that defines a value by only referring to a number of repetitions of the body, and for writing a program that includes the second arithmetic expression in place of the first arithmetic expression to the second storage means.

8. The optimization apparatus of claim 7, wherein:

the loop structure is for processing a sequence of numbers;

a j-th value in the sequence of numbers is referred to in the i-th repetition;

a (j+m)th value in the sequence of numbers is referred to in an (i+x)th repetition of the body; and the body of the loop includes a plurality of arithmetic expressions, each of which is a recurrence formula that defines the (j+m)th value by referring to the j-th value;

the second arithmetic expression converted by the conversion means is a non-recurrence formula that defines an i-th value by only using the induction variable i.

9. A computer-readable storage medium that stores an optimization program for optimizing a program so as to be suitable for pipeline processing, the program including a loop structure composed of a body and a control statement, the body including at least one arithmetic expression, the control statement prescribing a repeat condition for the body, the optimization program comprising:

a detection step for detecting a first arithmetic expression that defines a value in an i-th repetition of the body, the value being to be referred to in an (i+x) th repetition of the body, where i and x are positive integers;

an estimation step for estimating, based on a value of x, an execution delay that will occur when the body is repeatedly executed in pipeline processing; and a conversion step for converting, when the execution delay exceeds a predetermined threshold level, the first arithmetic expression into a second arithmetic expression that defines a value in the i-th repetition, the value being to be referred to in an (i+y)th repetition of the body, where y is an integer that is greater than x.

10. The computer-readable storage medium in claim 9, wherein:

the loop structure is for processing a sequence of numbers;

a j-th value in the sequence of numbers is referred to in the i-th repetition, where j is a positive integer;

a (j+m)th value in the sequence of numbers is referred to in the (i+x)th repetition;

a (j+n)th value in the sequence of numbers is referred to in the (i+y)th repetition, where n and m are integers and n is greater than m;

the first arithmetic expression detected in the detection step is a first recurrence formula that defines the (j+m)th value by referring to the j-th value; and the second arithmetic expression converted in the conversion step is a second recurrence formula that defines the (j+n)th value by referring to the j-th value.

11. The computer-readable storage medium in claim 10, wherein:

the repeat condition prescribed by the control statement is expressed using an induction variable i, which is either incremented or decremented by a predetermined amount every time the body is repeated;

the j-th value is stored in an array variable [i] that is specified by the induction variable i;

the (j+m)th value is stored in an array variable [i+x] that is specified by a subscript expression i+x; and the value of x is a difference between the subscript expression i+x and the induction variable i.

12. The computer-readable storage medium in claim 11, wherein the estimation step includes:
- a first calculation substep for calculating a number of instructions from (a) an instruction to refer to the j-th value to (b) an instruction to define the (j+m) value, if the first recurrence formula is replaced with a sequence of machine instructions; and
- a second calculation substep for calculating the execution delay, by multiplying the calculated number of instructions by the value of x.

13. The computer-readable storage medium in claim 12, wherein:
- a value of y is the execution delay calculated by the second calculation unit;
- the (j+n)th value is stored in an array variable [i+y] that is specified by a subscript expression i+y; and
- the second recurrence formula converted by the conversion step defines the array variable [i+y] by referring to the array variable [i].

14. The computer-readable storage medium in claim 10, wherein the detection step further includes:
- a first detection substep for detecting a third arithmetic expression from the body of the loop, the third arithmetic expression defining the (j+m)th value and not referring to the j-th value;
- a second detection substep for detecting a fourth arithmetic expression from the body of the loop, the fourth arithmetic expression referring to the j-th value; and
- a combination substep for combining the third arithmetic expression with the fourth arithmetic expression, to obtain the first recurrence formula;
- wherein the conversion step converts the first recurrence formula obtained by the combination substep into the second recurrence formula.

* * * * *